(12) United States Patent
Singh et al.

(10) Patent No.: US 7,996,376 B2
(45) Date of Patent: Aug. 9, 2011

(54) METHOD AND APPARATUS FOR MANAGING SESSION DATA ACROSS MULTIPLE APPLICATIONS

(75) Inventors: Sumit Singh, Irving, TX (US); Jithesh Parambath, Chennai (IN); Darshan Gupta, Irving, TX (US); Hemachandran Babu, Chennai (IN); Javier Martinez, Coppell, TX (US); Kishore Bomma, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 241 days.

(21) Appl. No.: 11/553,957

(22) Filed: Oct. 27, 2006

(65) Prior Publication Data

US 2008/0147658 A1 Jun. 19, 2008

(51) Int. Cl.
*G06F 7/00* (2006.01)
*G06F 15/16* (2006.01)
*H04K 1/00* (2006.01)

(52) U.S. Cl. ......... 707/703; 707/793; 709/227; 713/172

(58) Field of Classification Search .................. 707/703, 707/797; 709/227; 713/172
See application file for complete search history.

(56) References Cited

U.S. PATENT DOCUMENTS

| | | | |
|---|---|---|---|
| 6,801,914 B2* | 10/2004 | Barga et al. | 707/10 |
| 6,986,040 B1* | 1/2006 | Kramer et al. | 713/155 |
| 7,188,176 B1* | 3/2007 | Nedderman et al. | 709/227 |
| 7,225,464 B2* | 5/2007 | Satyavolu et al. | 726/10 |
| 2003/0040995 A1* | 2/2003 | Daddario et al. | 705/35 |
| 2003/0065919 A1* | 4/2003 | Albert et al. | 713/168 |
| 2003/0069906 A1* | 4/2003 | Cichowlas et al. | 707/501.1 |
| 2004/0044866 A1* | 3/2004 | Casazza | 711/163 |
| 2006/0195476 A1* | 8/2006 | Nori et al. | 707/104.1 |
| 2007/0088831 A1* | 4/2007 | Pallamreddy et al. | 709/227 |
| 2007/0237086 A1* | 10/2007 | Tulac et al. | 370/244 |
| 2008/0040484 A1* | 2/2008 | Yardley | 709/227 |

OTHER PUBLICATIONS

Peter et al. "Session Persistence—Improving Performance Using WebSphere and DB2 UDB", Mar. 1, 2002, http://www-128.ibm.com/developerworks/db2/library/techarticle/0203kitchlu/0203kitchlu.html.*

* cited by examiner

*Primary Examiner* — Etienne P LeRoux
*Assistant Examiner* — Cindy Nguyen

(57) ABSTRACT

An approach is provided for managing session information across application boundaries. Session information is obtained of a first application. The session information is stored. The session information is provided to a second application, wherein the session information is particular to a user session and includes data to be persisted across boundaries of the first application and the second application.

20 Claims, 5 Drawing Sheets

METHOD AND APPARATUS FOR MANAGING SESSION DATA ACROSS MULTIPLE APPLICATIONS

BACKGROUND INFORMATION

Business organizations rely on accurate and efficient sales processes to ensure profitability. Unfortunately, organizations, in particular large companies, are susceptible to inefficiencies in their processes because of the volume of orders, the breadth and complexity of applications, and the numbers of users involved. Any one user, in any one browser session, can traverse several applications that are structurally independent from one another. For instance, with sales order completion, among other tasks, information entered in one application is lost to another application, and subsequently must be re-keyed. Considering the time and effort to manually re-enter information in a high transaction system, significant costs are incurred. Also, such re-entry process can be prone to human error.

Therefore, there is a need for an approach for effectively maintaining session data across multiple applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing session management are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
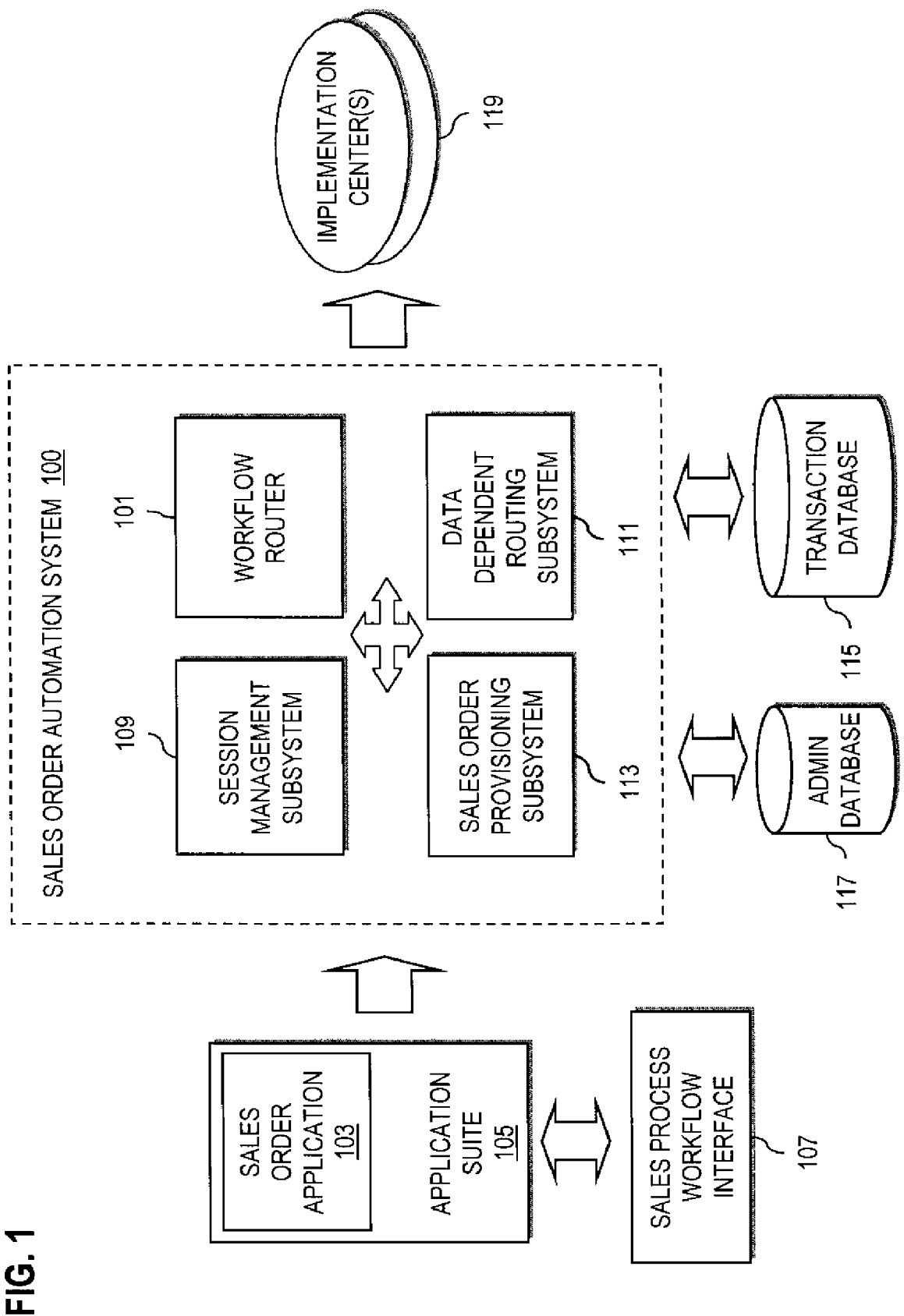
FIG. 1 is a diagram of an automated sales order fulfillment system capable of providing data persistence across multiple applications, in accordance with an exemplary embodiment.

FIG. 1 is a diagram of an automated sales order fulfillment system capable of providing data persistence across multiple applications, in accordance with an exemplary embodiment. An automated sales force workflow system 100 encompasses a workflow router 101 for distributing sales orders generated from a sales order application 103. The sales order application 103 can be part of an application suite 105 that supports sales and marketing functions, which lead to the fulfillment of sales orders. The application suite 105 can be deployed in multiple sales centers (not shown). A user can interact with the application suite 105 using a sales process workflow interface 107 as a front end presentation screen to utilize any number of sales, marketing, and even accounting applications. At any point in any application, user-entered data related to a sales order may be collected. It is recognized that applications, such as web-based applications, need to maintain some cross-request state information (e.g., shopping carts, data scrolling and so on); such information is effectively managed by a session management subsystem 109.

The session management subsystem 109 maintains copies of collected data for persistence across applications, to eliminate, for instance, the need for user re-keying of information, thereby more efficiently conducting transactions. This capability is further described in FIGS. 2-4. The session management subsystem 109 can pre-populate an interface screen with any previously-collected data related to the sales order. Upon completion of the sales order, the session management subsystem 109 can initiate the order implementation process by forwarding the collected sales order data to data dependent routing subsystem 111.

Among other functions, the data dependent routing subsystem 111 may be used to load balance the transfer of data to the system 100. The subsystem 111 communicates via a sales order provisioning system 113 to deposit the collected data in a transaction database 115.

An administration database (denoted as "admin database") 117 is also maintained to store user profile information and other management information about the system 100. In an exemplary embodiment, the admin database 117 can store business rules and criteria necessary of the workflow router 101 to process the sales orders.

As shown, the workflow router 101 communicates with one or more implementation centers 119 to properly route the sales orders based on the business rules. As such, these implementation centers 119 represent multiple end points for completed order handling. Accordingly, the workflow router 101 performs selection decisions as to avoid mistaken identification of available, capable end points and/or lost parts of a multi-item order.

Figure 2:
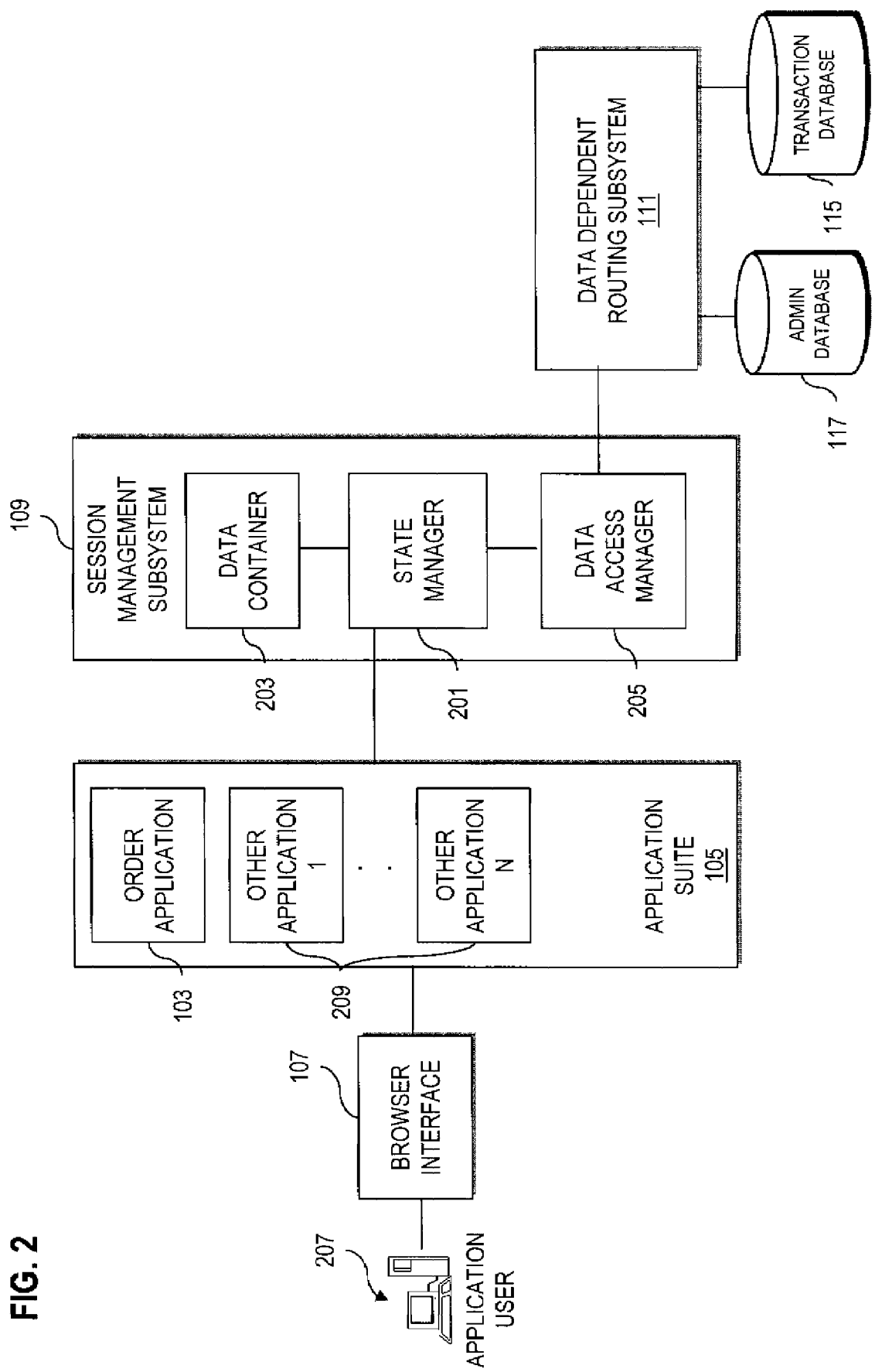
FIG. 2 is a diagram of the session management subsystem of the system of FIG. 1, according to an exemplary embodiment.

FIG. 2 is a diagram of the session management subsystem of the system of FIG. 1, according to an exemplary embodiment. As shown, the session management subsystem 109 includes a state manager 201, a data container 203, and a data access manager 205 to manage session information for a user 207. With traditional systems, session state does not persist across application boundaries. If a web application, for example, switches to another application during execution, the session information is not available to the new application. By contrast, the subsystem 109 can store values that need to be persisted for the duration of a user's session in session variables, for example. In an exemplary embodiment, these variables are unique to each user session and can be accessed in page within an application. Managing session data includes storing and loading data whenever it is required by the application.

By way of example, the user 207 employs an interface 107, such as a web browser, to access the application suite 105. The state manager 201 has the responsibility for maintaining the browser session. The data container 203 is used as a container for the data to be persisted, to serialize and desterilize the data contained therein. The application suite 105 can include various applications 209 other than the sales order application 103. At any one user session, the user 207 can invoke one or more applications, whereby the state manger 201 can maintain the session information across these applications 103, 209. Data associated with the user session is stored in the data container 203. The data access manager 205 controls the exchange of information in conjunction with the data dependent routing subsystem 111.

According to an exemplary embodiment, the application suite 105 includes sales and marketing applications, which can encompass various marketing tools for managing accounts and contacts for tracking sales leads, etc. Other applications can include a quotes generation application that enables a user via a computing device or system to prepare sales quotes for a customer. The user can also develop proposals and contracts using the proposal generation application and the contract generation application, respectively. An ordering application can be included in the application suite 105 to support creation, modification and tracking of sales orders. Additional applications include a repairs application to generate trouble tickets and dispatch work force resources, as well as a billing application to ensure invoices resulting from the sales orders are timely produced. Further, a communications application can be used to provide various communication media for the user —e.g., facsimile and e-mail capability. Any number and type of applications can be utilized depending on the requirements of the organization.

With the session management subsystem 109 these applications can share data, which would traditionally not be available (i.e., persisted). For example, information that is entered while processing a repairs application instance may lead to an ordering application invocation for purposes of ordering parts to complete the repair. Previously stored information may be imported into the current session as well. In addition, the billing application can be triggered to generate an associated invoice for the repair.

As another example, the quotes generation application may gain access to a prior sales quote provided to a prospective customer, who has now, for the current user session's purposes, accepted the terms and is ready for the order to be completed. The prior quoted products and prices are accessed via the quotes generation application and moved, as the user navigates, to ordering application. The prior quote may be over-ridden by a new or expired "special promotion event" that is only available through access to the marketing tools application. Moreover, the customer may have requested only a subset of those products listed in the original quote. In such case, it may be necessary to invoke the contract generation application to determine whether the pricing previously quoted is being honored.

To enable the crossing of multiple application boundaries, the session management subsystem 109 utilizes state manager 201, the data container 203, and the data access manager 205 to control access to the databases 115, 117 for obtaining previously-stored information that the user has retrieved in this session, to maintain the collected data (both previously-stored and user-entered in the current session), and to maintain user session states.

The state manager 201 communicates the application suite 105 to identify the current session state of the user's session, requests data from the data container 203 and/or requests data from the data dependent routing subsystem 111 as necessary. The state manager 201 returns the retrieved data to the relevant application(s), and updates the current session state accordingly. In an exemplary embodiment, the session values recorded by the state manager 201 are categorized into Session, Common, Pricing, and Ordering related information. However, other categories can be defined depending on the implementation.

In an exemplary embodiment, the data access manager 205 controls access, through data dependent routing subsystem 111, to the previously-stored data requested by the user in a particular session (e.g., a prior sales quote). Also in this exemplary implementation, a data container 203 maintains the persistent data and controls access to the temporarily stored data. In an exemplary implementation of the data container 203, the session data are stored in Structured Query Language (SQL) database (e.g., transaction database 115).

The operation of the session management subsystem 109 is now described with respect to the capability to persist data.

Figure 3:
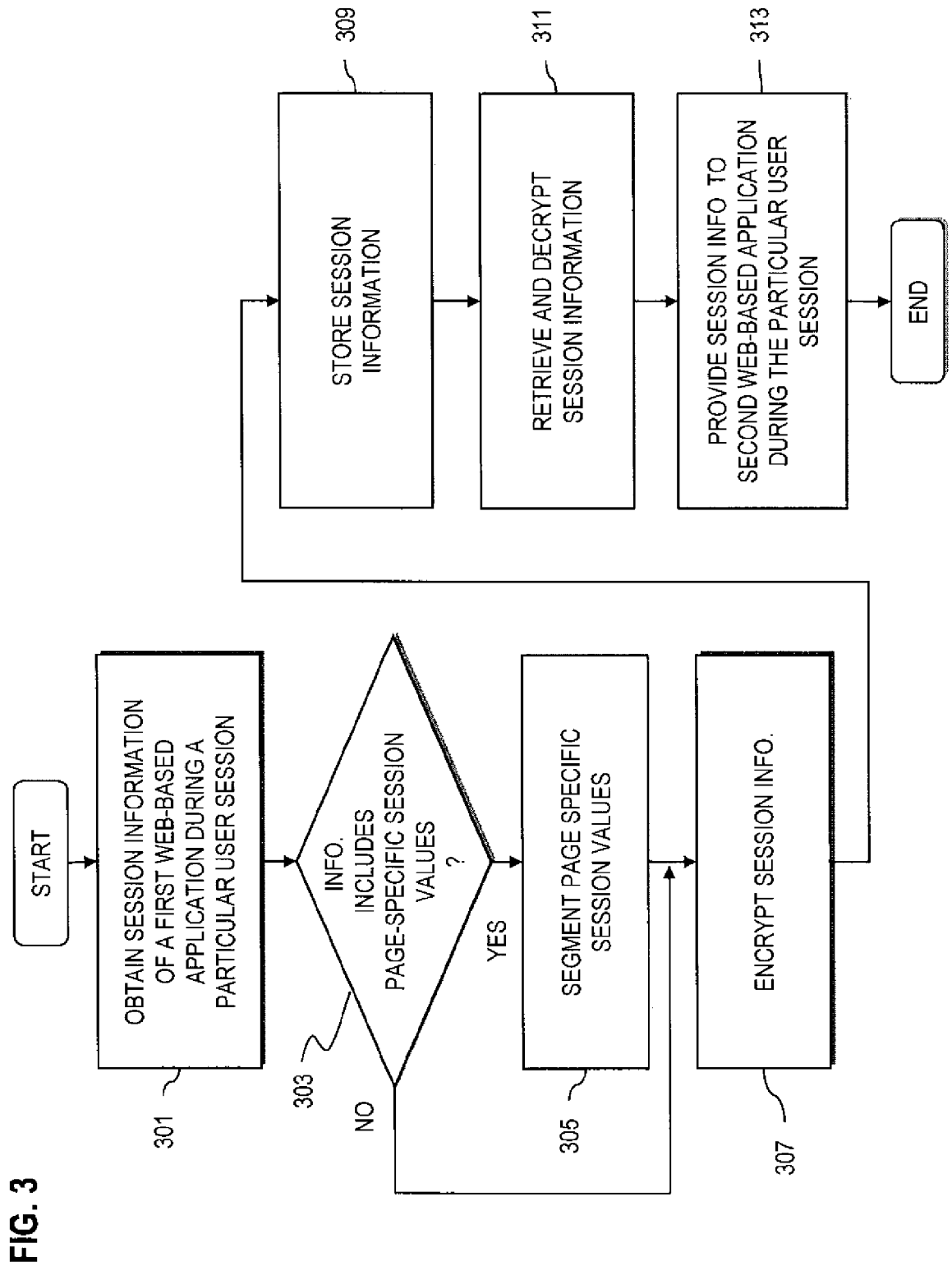
FIG. 3 is a flowchart of a process for maintaining session information across application boundaries, according to various exemplary embodiments.

FIG. 3 is a flowchart of a process for maintaining session information across application boundaries, according to various exemplary embodiments. For the purposes of illustration, the process is explained with respect to web-base applications accessible through a graphical user interface (GUI) such as a browser (e.g., browser interface 107 of FIG. 2). Also, it is noted that the application suite 105 can include multiple applications that are web-based. In step 301, session information of a first application (e.g., web-based application) during a particular user session. Next, it is determined whether the session information includes page-specific session values (step 303). If the session information indeed contains page-specific session values, these values are segmented, as in step 305, for efficient storage and retrieval. The page information trace can be stored, such that the required information for different pages is retrieved and stored in different containers in local memory for quick access.

In step 307, the session information can optionally be encrypted. The session information is then stored, as in step 309. Assuming the session information was encrypted for storage, the information can subsequently be retrieved and then decrypted (step 311). Thereafter, the session information is provided, as in step 313, to a second web-based application during the user session.

Figure 4:
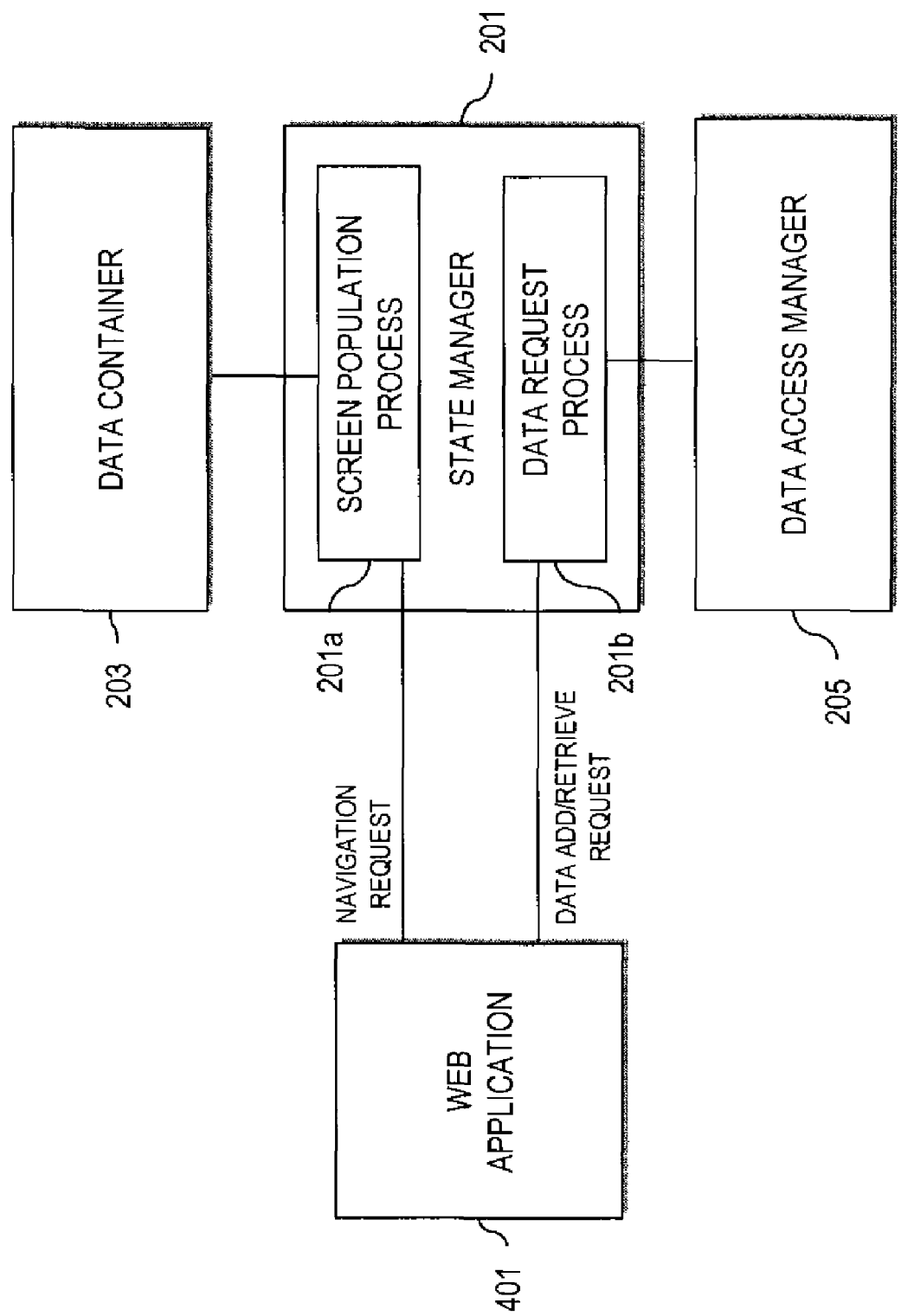
FIG. 4 is a diagram of a state manager interacting with a data container and a data access manager to provide management of session information, according to an exemplary embodiment.

FIG. 4 is a diagram of a state manager interacting with a data container and a data access manager to provide management of session information, according to an exemplary embodiment. In this example, the state manager 201 interacts with a web application 401 to process navigation requests and data add/retrieve requests using a screen population process 201a and a data request process 201b. A navigation request is submitted to the screen population process 201a of state manager 201, with sufficient information to identify the user and the screen requested. The screen population process 201a identifies the current state of the user's session, and requests, from the data container 203, any information available to populate that screen for that user (for example, the current state may require a complete refresh of the screen, or an update of components of the screen).

Also, the data container 203 retrieves page-specific data from memory and returns it to the screen population process 201a. In response, the screen population process 201a returns the data to browser interface 107 for user screen population. Subsequently, the state manager 201 updates the user's session state, as appropriate.

With respect to the data add/retrieve request from the user, the request is submitted to a data request process 201b of the state manager 201, with sufficient information to identify the user and the data requested. It is recognized that session security is critical to the overall security of the application 401; thus, the session information is collected by state manager 201 and securely stored. The data request process 201b identifies the current state of the user's session and forwards the request to the data access manager 205. If the request is to add information, the data access manager 205 requests a data deposit to one or more of those databases 115, 117 via a request to the data dependent routing subsystem 111, according to an exemplary embodiment.

If the request 303 is for data retrieval, the data access manager 205 requests data retrieval from one or more of those databases 115, 117. The data dependent routing subsystem 111 retrieves the information.

After each of the above activities, the state manager 201 updates the current state of the user's current session, retaining the appropriate session data. The described arrangement utilizes reusable components and an expandable data source.

The above described processes relating to access control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
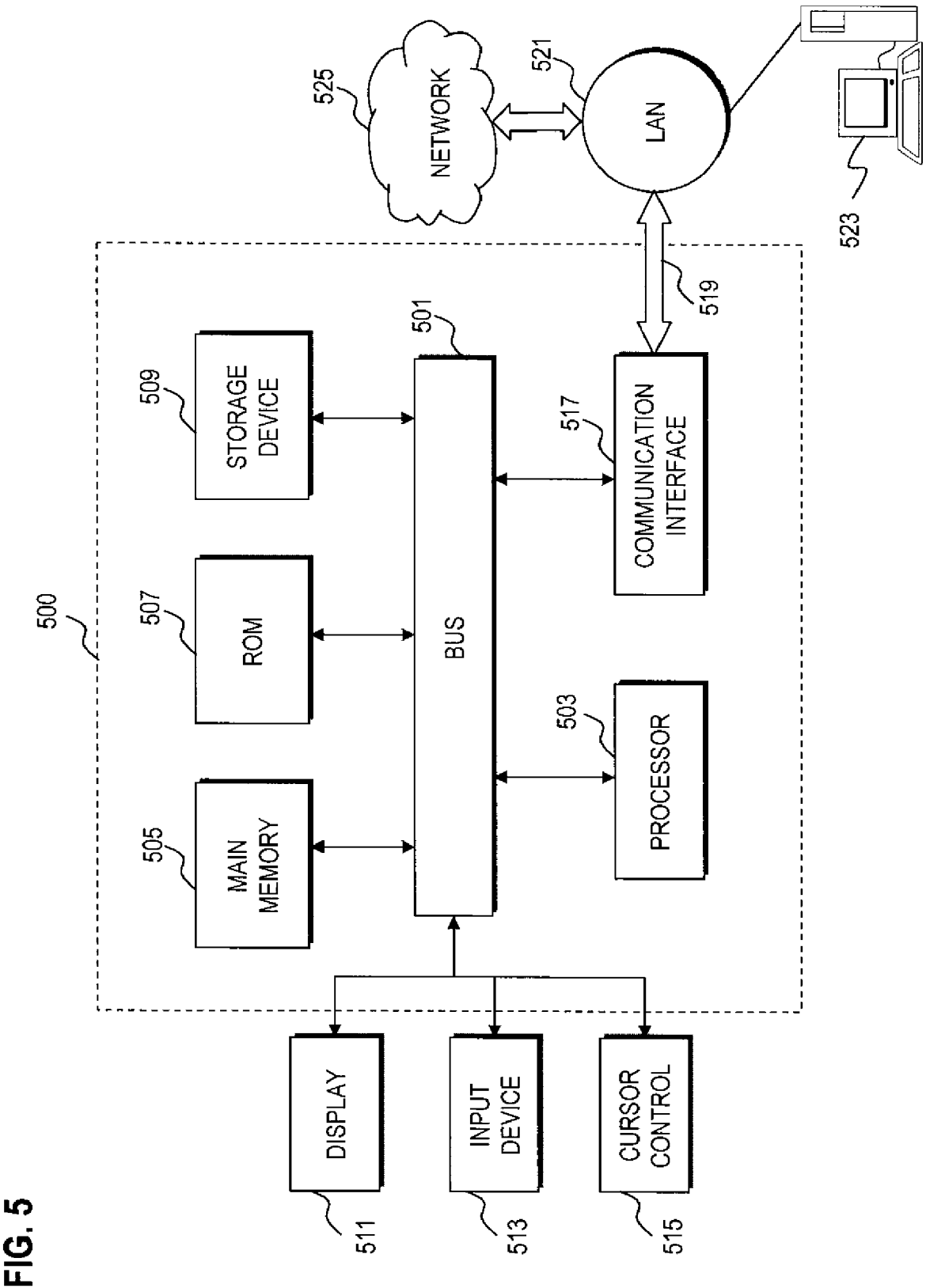
FIG. 5 is a diagram of a computer system that can be used to implement various exemplary embodiments.

FIG. 5 illustrates a computer system 500 upon which an exemplary embodiment can be implemented. For example, the processes described herein can be implemented using the computer system 500. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an exemplary embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the exemplary embodiment. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   obtaining, by a processor, session information of a first application;
   determining, by the processor, whether the session information includes page-specific session values;
   updating, by the processor, the current state of the session information after obtaining the session information and after determining whether the session information includes page-specific session values;
   storing the session information; and
   providing, by the processor, the session information to a second application, wherein the session information is particular to a user session and includes data to be persisted across boundaries of the first application and the second application,
   wherein the session information includes page-specific session values, the method further comprising:
   segmenting the page-specific session values, and storing the page-specific values separately.

2. A method according to claim 1, wherein the first application and the second application are web-based applications that support sales transactions.

3. A method according to claim 2, wherein the data includes values associated with pricing and ordering.

4. A method according to claim 2, wherein at least one of the web-based application is accessible via a browser application.

5. A method according to claim 4, wherein the session information is stored within a web server.

6. A method according to claim 1, further comprising:
   encrypting, by the processor, the session information for storage.

7. The method according to claim 1, wherein the session information comprises data entered into the first application by the user.

8. An apparatus comprising:
   at least one processor, the at least one processor configured to obtain session information of a first application, determine whether the session information includes page-specific session values, and update the current state of the session information after obtaining the session information and after determining whether the session information includes page-specific session values;
   a database coupled to the at least one processor, the database being configured to store the session information, wherein the session information is provided to a second application,
   wherein the session information is particular to a user session and includes data to be persisted across boundaries of the first application and the second application, and wherein the session information includes page-specific session values, the at least one processor is further configured to segment the page-specific session values, and the database being further configured to store the page-specific information separately.

9. An apparatus according to claim 8, wherein the first application and the second application are web-based applications that support sales transactions 10. An apparatus according to claim 9, wherein the data includes values associated with pricing and ordering.

11. An apparatus according to claim 9, wherein at least one of the web-based application is accessible via a browser application.

12. An apparatus according to claim 11, wherein the session information is stored within a web server.

13. An apparatus according to claim 8, wherein the session information is encrypted for storage.

14. The apparatus according to claim 8, wherein the session information comprises data entered into the first application by the user.

15. A system comprising:
   a state manager configured to obtain session information of a first web-based application, determine whether the session information includes page-specific session values, and update the current state of the session information after obtaining the session information and after determining whether the session information includes page-specific session values; and
   a memory configured to store the session information, wherein the state manager is further configured to provide the session information to a second web-based application during a common user session,
   wherein the session information includes data to be persisted across boundaries of the first web-based application and the second web-based application,
   wherein the session information includes page-specific session values, the state manager is further configured to segment the page-specific session values, and the memory being further configured to store the page-specific information separately.

16. A system according to claim 15, wherein the web-based applications support sales transactions.

17. A system according to claim 16, wherein the data includes values associated with pricing and ordering.

18. A system according to claim 15, wherein at least one of the web-based application is accessible via a browser application.

19. A system according to claim 18, wherein the session information is stored within a web server.

20. A system according to claim 15, wherein the state manager is further configured to encrypt the session information for storage.

* * * * *